(12) United States Patent
Weaver et al.

(10) Patent No.: US 10,259,181 B2
(45) Date of Patent: *Apr. 16, 2019

(54) SLEEVELESS TIRE BUILDING DRUM

(75) Inventors: Douglas Raymond Weaver, Uniontown, OH (US); Lawrence Dean Shull, Fayetteville, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 360 days.

This patent is subject to a terminal disclaimer.

(21) Appl. No.: 13/585,904

(22) Filed: Aug. 15, 2012

(65) Prior Publication Data
US 2014/0048212 A1    Feb. 20, 2014

(51) Int. Cl.
*B29D 30/24* (2006.01)

(52) U.S. Cl.
CPC .................. *B29D 30/245* (2013.01)

(58) Field of Classification Search
CPC .... B29D 30/24; B29D 30/242; B29D 30/245; B29D 30/246; B29D 2030/265; B29D 2030/2657; B29D 2030/2664; B29D 30/36; B29D 2030/2642
USPC ....... 156/133, 407, 414, 415, 416, 417, 418, 156/419, 420
See application file for complete search history.

(56) References Cited

U.S. PATENT DOCUMENTS

| | | |
|---|---|---|
| 3,207,648 A | 9/1965 | Shilts |
| 3,607,558 A | 9/1971 | Nebout |
| 3,616,059 A * | 10/1971 | Frazier ................ B29D 30/245 156/400 |
| 4,214,939 A * | 7/1980 | Enders ......................... 156/398 |
| 4,229,246 A * | 10/1980 | Vanderzee ............. B29D 30/32 156/132 |
| 4,239,579 A * | 12/1980 | Felten et al. .................. 156/398 |
| 4,269,649 A * | 5/1981 | Vanderzee ............. B29D 30/36 156/126 |
| 6,012,500 A * | 1/2000 | Connor .......................... 156/398 |

(Continued)

FOREIGN PATENT DOCUMENTS

| | | | | |
|---|---|---|---|---|
| DE | 2317655 | * | 10/1974 | ............. B29D 30/36 |
| DE | 2705504 | * | 8/1978 | ............. B29H 17/18 |

(Continued)

OTHER PUBLICATIONS

Machine generated English language translation of DE 2705504 (original document dated Aug. 1978).*

(Continued)

*Primary Examiner* — Michael H. Wilson
(74) *Attorney, Agent, or Firm* — June E. Rickey (57) ABSTRACT

A tire building drum and a method of building a tire carcass is disclosed. The tire building drum has a center section comprised of a plurality of segments that are radially and axially movable. The sleeve of the tire building drum over the center section has been eliminated, and instead has two seals located on the outer ends or shoulders of the center section of the tire building drum. The building drum further comprises shoulder sections that are axially movable. The shoulder sections include radially expandable bead locks. The method employs the steps of applying one or more carcass layers, locking the bead locks and moving the center section radially outwardly while moving the bead locks axially inwardly.

4 Claims, 11 Drawing Sheets

(56) References Cited

U.S. PATENT DOCUMENTS

| | | | |
|---|---|---|---|
| 6,360,802 B1 * | 3/2002 | Baldoni | B29D 30/245 |
| | | | 156/415 |
| 7,152,649 B2 * | 12/2006 | Sala | 156/402 |
| 2001/0050148 A1 * | 12/2001 | Terazono | 156/415 |
| 2001/0054485 A1 * | 12/2001 | Farinola | 156/416 |
| 2003/0047284 A1 | 3/2003 | Akiyama | |
| 2005/0028920 A1 * | 2/2005 | Roedseth et al. | 156/132 |
| 2006/0137825 A1 * | 6/2006 | Roedseth et al. | 156/415 |
| 2009/0151873 A1 * | 6/2009 | Pinto et al. | 156/416 |

FOREIGN PATENT DOCUMENTS

| | | | | |
|---|---|---|---|---|
| EP | 2008798 B1 | | 6/2012 | |
| GB | 1113622 | * | 5/1968 | B29D 30/24 |

OTHER PUBLICATIONS

Machine generated English language translation of DE 2317655 (original document dated Oct. 1974).*
EPO Search Report dated Nov. 5, 2013.

* cited by examiner

SLEEVELESS TIRE BUILDING DRUM

FIELD OF THE INVENTION

The invention relates to a tire building drum, more particularly to a tire building drum with no center sleeve.

BACKGROUND OF THE INVENTION

The manufacture of tires typically involves a tire building drum wherein numerous tire components are applied to the drum in sequence, forming a cylindrical shaped tire carcass. This stage of the tire building process is commonly referred to as the "first stage" of the tire building process. The tire carcass is then typically removed from the tire building drum and sent to a second stage, expandable tire shaping drum where the carcass is expanded into a toroidal shape for receipt of the remaining components of the tire such as the belt package and a rubber tread. The completed toroidally shape unvulcanized tire carcass or green tire is then removed from the second stage drum and subsequently molded and vulcanized into a finished tire.

The prior art process thus requires two tire building drums and the transfer of the carcass from one drum to the other. Further, a problem often arises in precisely locating and anchoring the tire beads on the unvulcanized tire carcass, especially during the transportation of the tire beads from the first stage drum to the second stage drum. Variations in bead positioning can result in ply distortion in the tire.

Tire manufacturers have recently begun moving towards the utilization of a single tire building drum, for both the first and second stage tire building. This requires that the tire building drum be capable of axial expansion and contraction as well as radial expansion/contraction. Further, it is important to maintain a positive bead lock during the entire tire building process, including the tire shaping, so that the ply cord length is maintained, resulting in good tire uniformity.

Tire manufacturers typically use a flexible cylindrical rubberized center sleeve as the outermost element on tire building drums. The center sleeve functions as the surface of application and point of fixation for the innermost component of the tire (innerliner). The section where the centersleeve wraps around the "shoulder" of the radially expansible segments also serves as a pneumatic seal against the bead area of the green tire, enabling inflation (shaping) of the green tire in the full-stage tire building process. The centersleeve also typically has a series of holes for providing a vacuum to secure the innerliner to the drum and the air to shape the green tire.

There are several disadvantages to the prior art rubber center sleeves. The tire building drums typically have a wide range of width adjustability, while the prior art rubber center sleeves have a very limited range of width operation, typically less than 30 mm. Thus the sleeve limits the action of the tire building drum, resulting in the need to change out the drum with another drum having a different width centersleeve in place. The necessity of changing out of the drum requires the storage of drums for different width sizes, and the loss in productivity during the drum change outs.

A second disadvantage to the prior art center sleeves is that during the tire building cycle the drum width is progressively reduced as the shaped diameter of the green tire increases. This reduced width action may result in the bunching up or buckling of the sleeve due to compression. As the buckled diameter is larger than the bead diameter of the tire, it is necessary to widen the width of the tire building drum in order to remove the finished tire from the drum.

A third disadvantage to the prior art center sleeves is that they are the highest maintenance component on the tire building drum, requiring frequent replacement when they become torn or blistered.

A fourth disadvantage to the prior art center sleeves is that the use of the sleeve results in an increased amount of force required to expand the drum.

A fifth disadvantage to the prior art center sleeves is that the use of the sleeve can result in uneven air flow distribution during inflation of the carcass, contributing to tire nonuniformity.

Definitions

For ease of understanding this disclosure, the following items are defined:

"Apex" means an elastomeric filler located radially above the bead and interposed between the plies and the ply turn-up.

"Axial" and "axially" means the lines or directions that are parallel or aligned with the longitudinal axis of rotation of the tire building drum.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafers" refers to narrow strips of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire building drum.

"Radial Ply Tire" means a belted or circumferentially restricted pneumatic tire in which at least one layer of ply has the ply cords extend from bead to bead at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The invention will be described by way of example and with reference to the accompanying drawings in which.

DETAILED DESCRIPTION OF THE INVENTION

Figure 1:
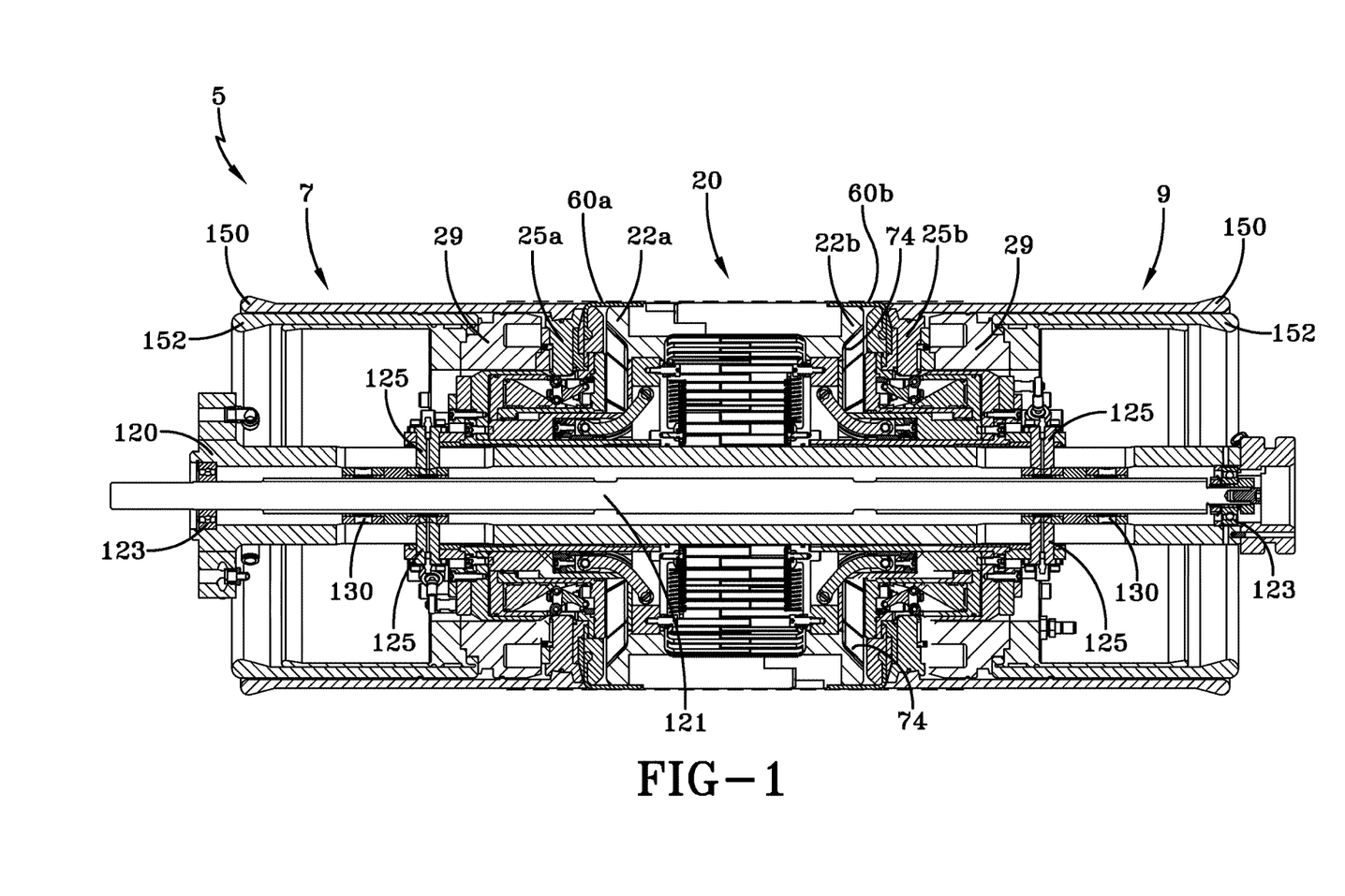
FIG. 1 is a front cross-sectional view of a tire building drum of the present invention shown having two shoulder sleeves mounted on the crown portion of the drum.
Figure 2:
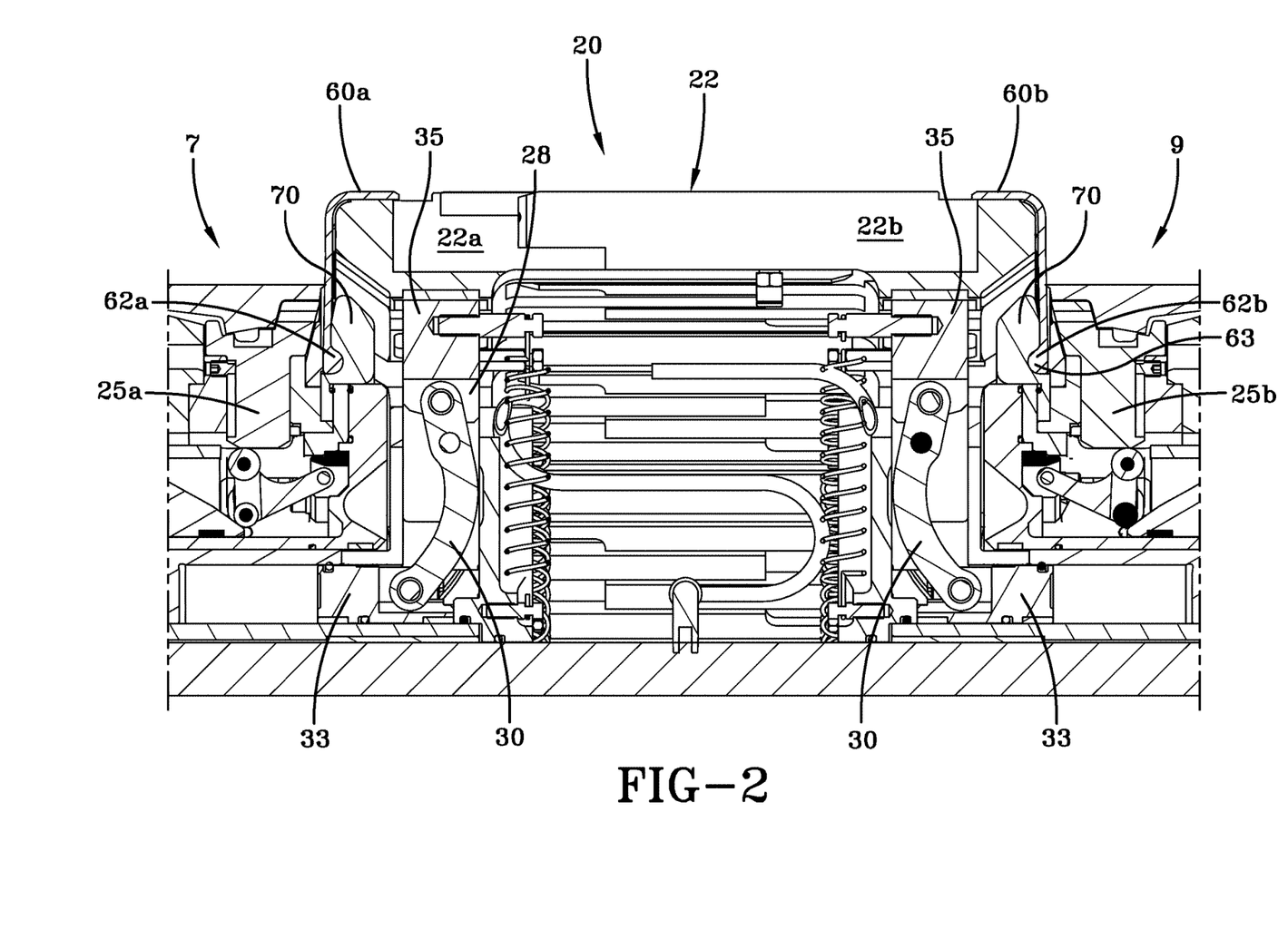
FIG. 2 is a close-up cross-sectional view of the tire building drum of FIG. 1 showing the drum in the radially expanded position.

With reference to FIGS. 1 through 2, an exemplary tire building drum 5 of the present invention is illustrated. As shown more particularly in FIG. 1, the tire building drum 5 has a left hand side 7 and a right hand side 9 joined together by a center section 20. The center section is further divided into a right hand side 22b and a left hand side 22a, which are both axially and radially movable, as described in more detail, below. Adjacent the center section 20 are first and second bead locking mechanisms 25a,b, which are also radially movable as shown in FIG. 2. Adjacent the bead locking mechanisms are first and second shoulder sections 29. Both the bead locking mechanisms and the shoulder sections are axially movable. Thus, both the left hand side and the right hand side of the drum are axially movable. These components are described in more detail, below.

Center Section

Figure 10:
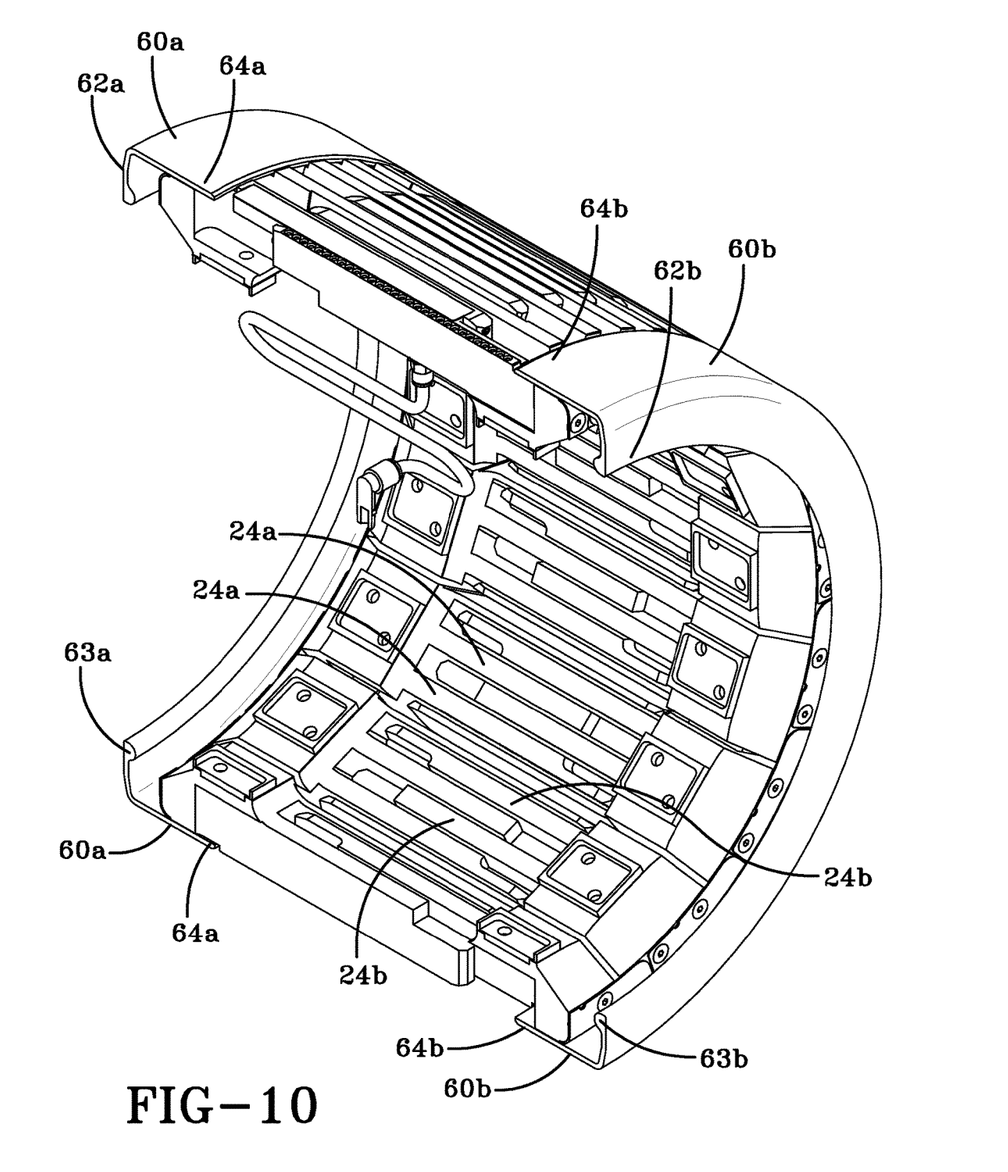
FIG. 10 is a cross sectional view of half of the center section of the tire building drum.
Figure 11:
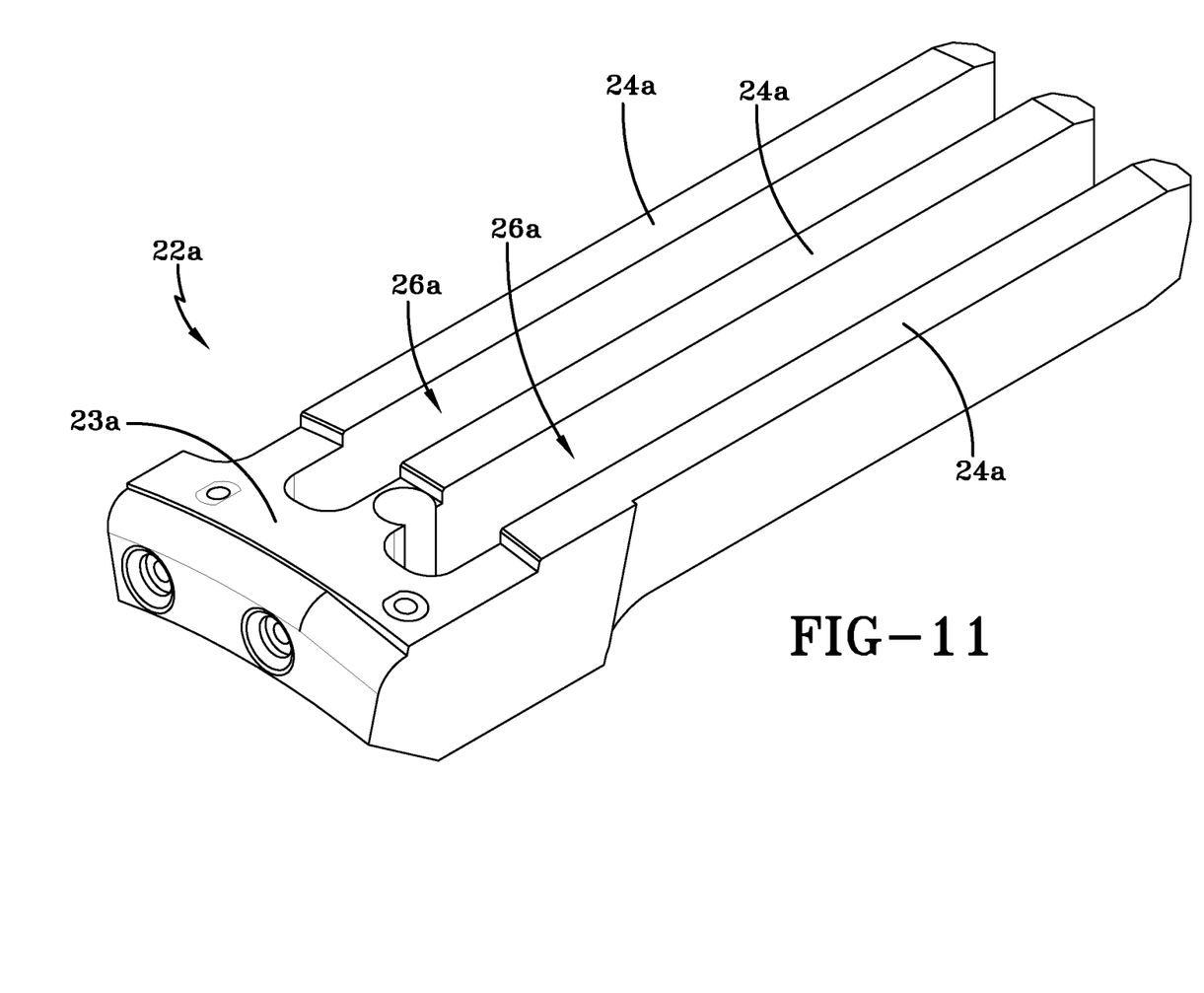
FIG. 11 is a top view of a single center section segment.
Figure 12:
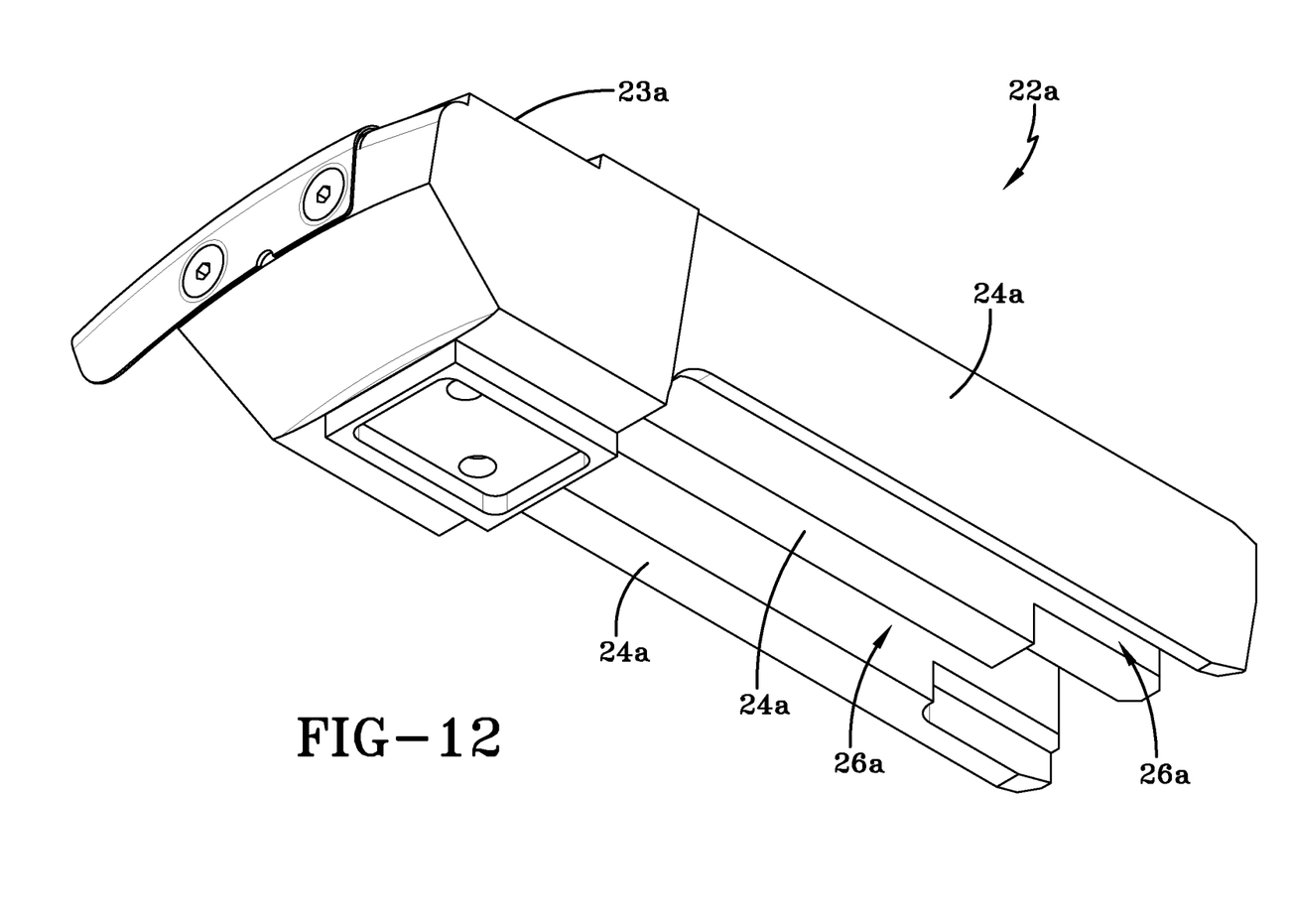
FIG. 12 is a bottom view of the single center section segment of FIG. 11.
Figure 13:
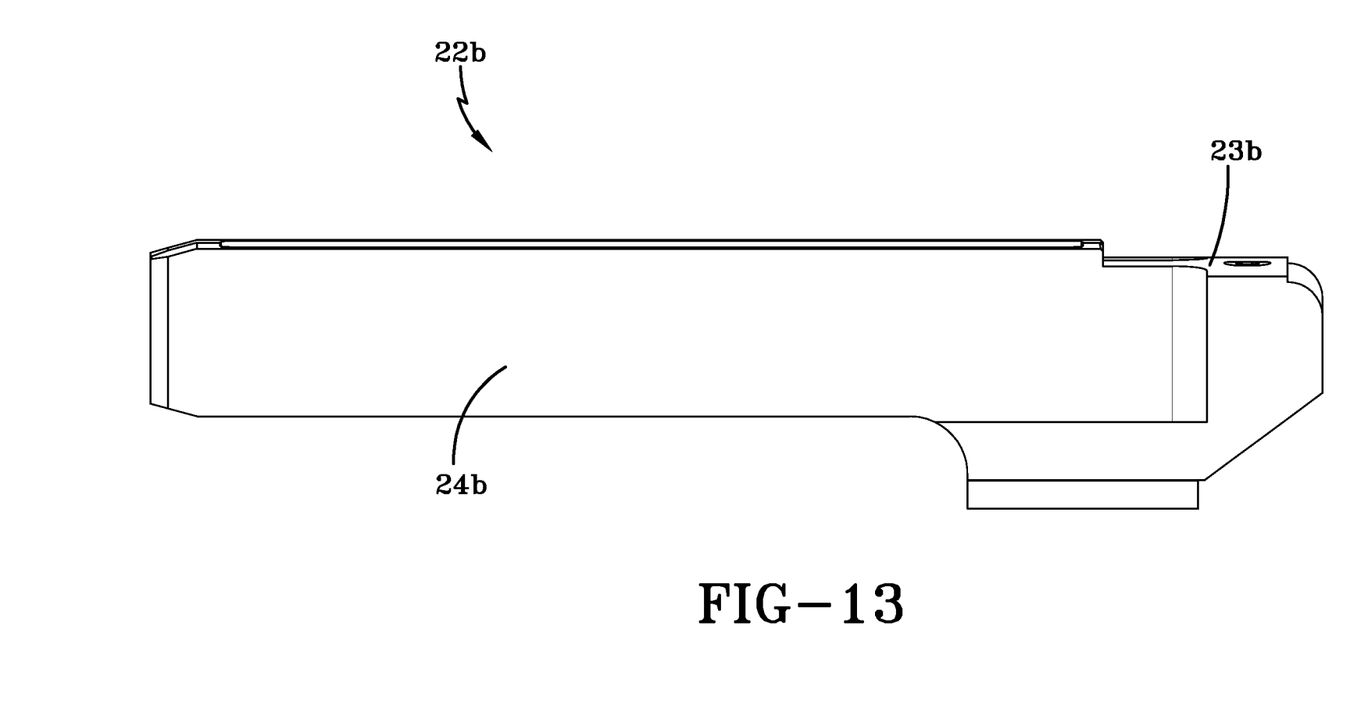
FIG. 13 is a side view of the single center section segment of FIG. 11.

The center section 20 of the tire building drum as shown in FIGS. 2-10 further comprises a plurality of center segments 22a,b located about the outer circumference of the drum. Each of the center segments may be further split into a left hand side 22a and a right hand side 22b, as shown in FIGS. 4-12 (although not required). As shown in FIG. 11, the left hand side center segment 22a has one or more finger like projections 24a, with recesses 26a. The right hand side is the mirror opposite. As shown in FIG. 10, left hand center segment 22a has three finger-like projections 24a which are slidably received in three elongate slots 26b in an interdigitated or interlocked manner. Likewise, right hand center segment 22b has three finger like projections 24b which are slidably received in three opposed elongate slots 26a. The center segments 22a,b thus cooperate with each other to axially expand or contract as the fingers slide within the recesses.

Figure 8:
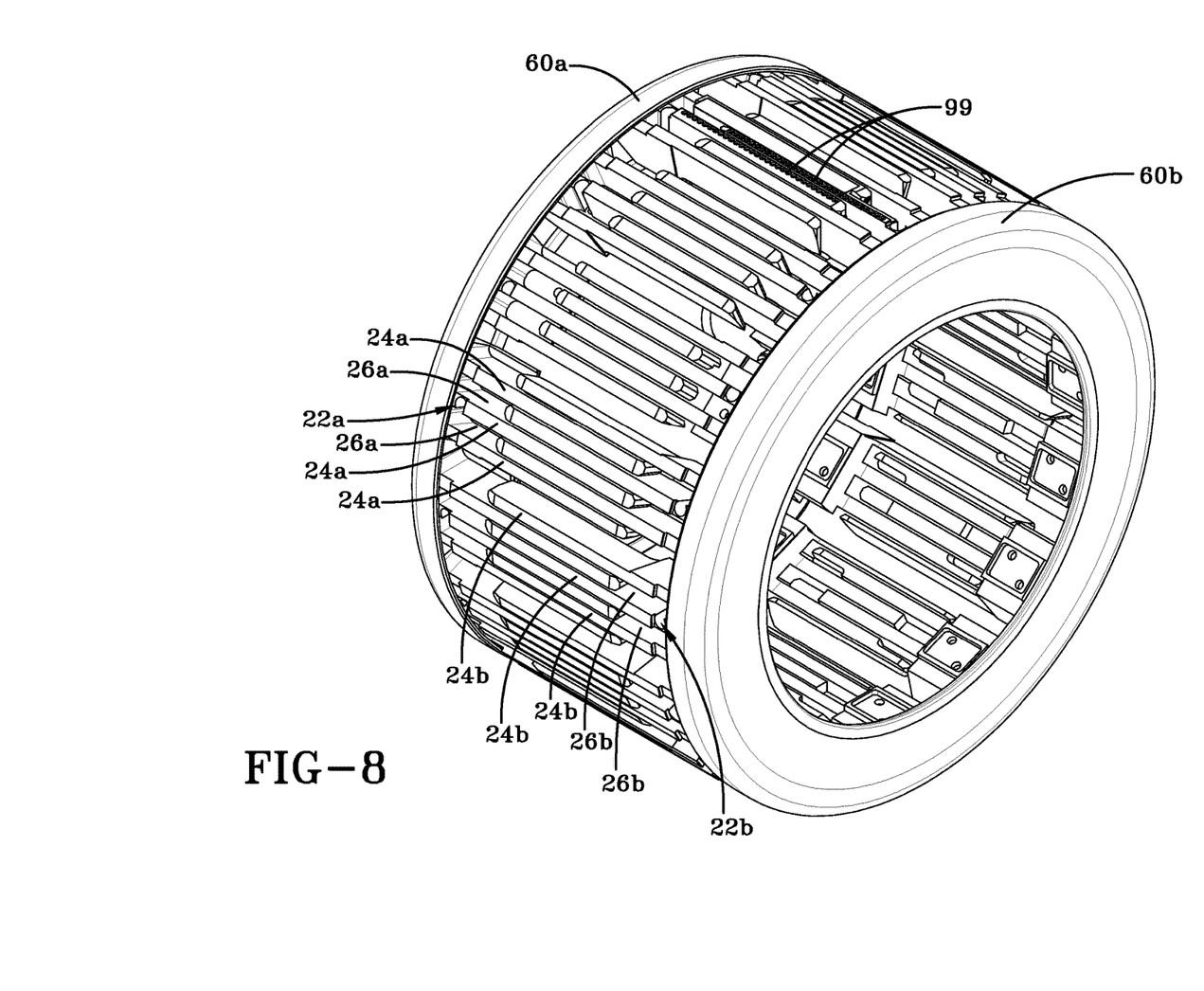
FIG. 8 is a perspective view of the center section of the tire building drum shown in the axially contracted position and radially expanded position.
Figure 9:
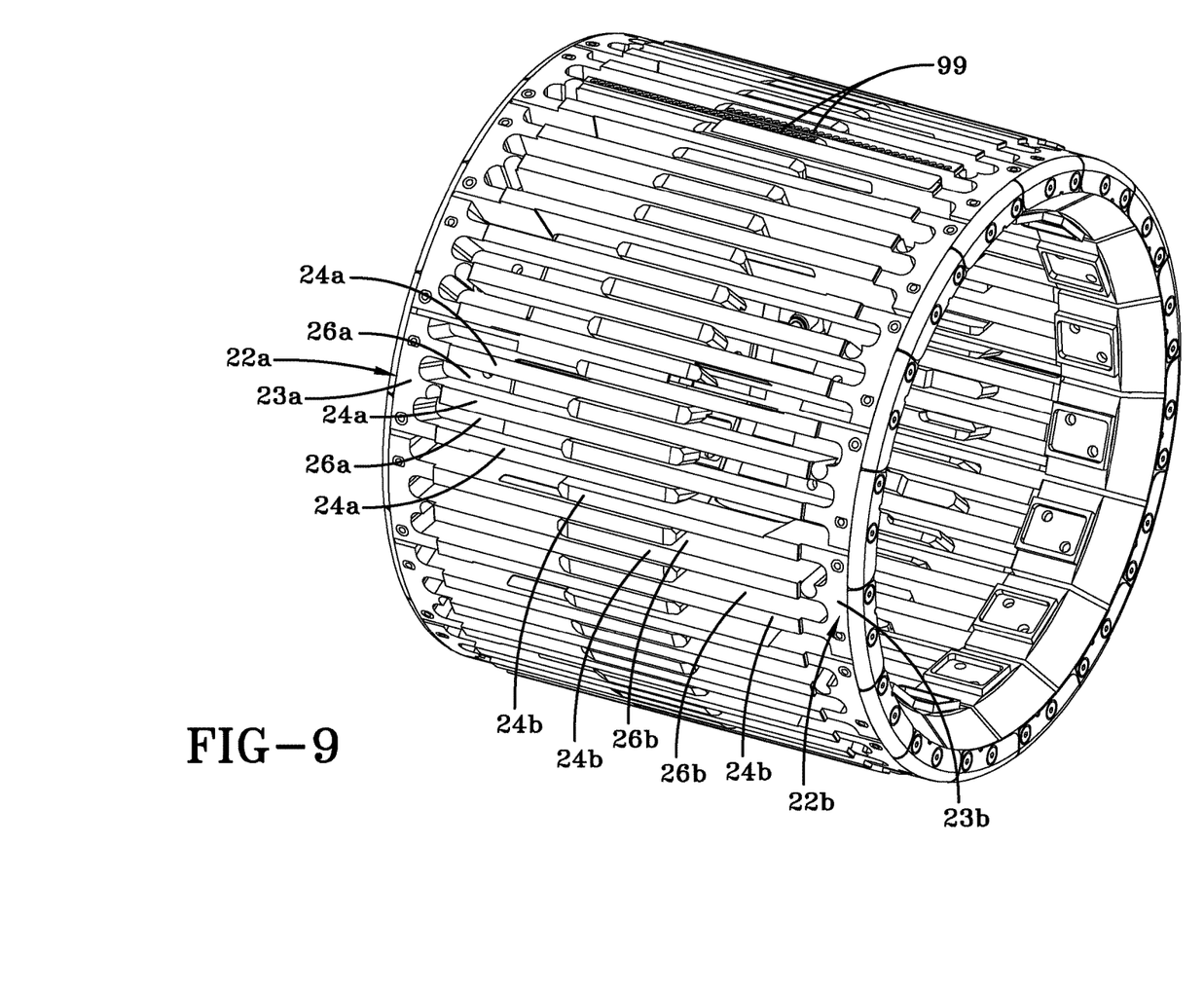
FIG. 9 is a perspective view of the center section in the axially expanded position of the tire building drum with the shoulder seals removed.

The center section 20 may also radially expand as shown in FIG. 8. The center section 20 can radially expand in the range of about 20 to about 50 mm. As each center segment 22a,b radially expands, the gap between the center segments increases. Provided within each center segment half 22a,b is a radially oriented piston chamber 28. Received in each chamber 28 is an elbow-shaped linkage 30 connected to a common actuator (not shown), such as a piston 33. A control system (not shown) actuates the pistons 33, causing linkage 30 to slide from the retracted position (not shown) to the actuated position shown in FIG. 2. When the linkages 30 are actuated, the linkages push the center segments radially outward into the high crown position as shown in FIG. 2.

Shoulder Seals

Figure 3:
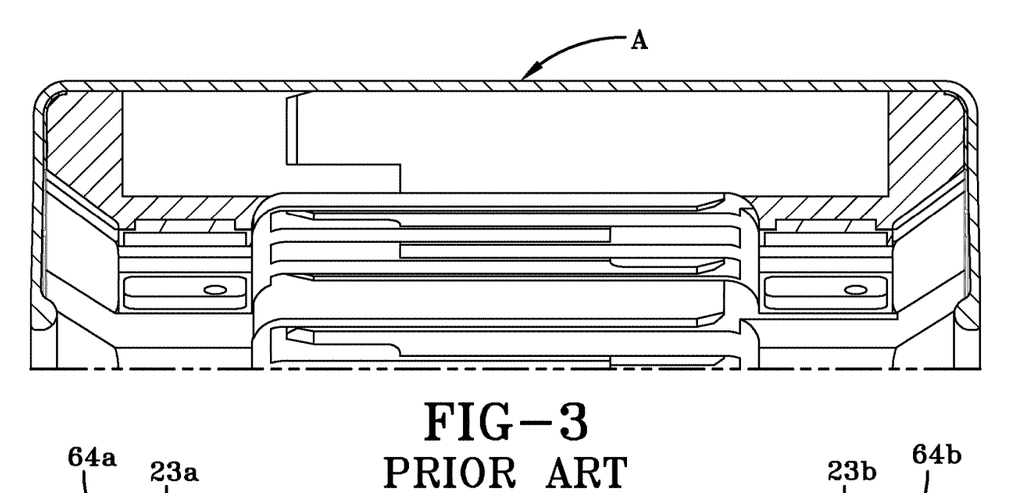
FIG. 3 is a close up cross-sectional view of a tire building drum in the expanded high crown condition shown with a prior art centersleeve.

FIG. 3 illustrates a typical tire building drum having a center section that is completely covered by a cylindrically shaped center sleeve A. The center sleeve A is typically comprised of thick rubber. The tire building drum of the present invention does not have a center sleeve, nor a sleeve or any type of rubber component that extends from one end of the center section to the other end, nor a sleeve that is located in the center of the center section of the drum. The tire building drum of the present invention has eliminated the center sleeve, and includes a first and second shoulder seal 60a,b. The purpose of the shoulder seals is to maintain the pneumatic seal between the bead of the green tire and the tire building drum, enabling inflation and shaping of the green tire in the full stage tire building process. The first and second shoulder seal 60a,b are located on the axially outer ends of the segments 22a,b forming the center section. Each center seal preferably has an overall annular shape, having a first end 62a,b which is secured in seal clamps 70 located adjacent the center section segments. Preferably the first ends 62a,b of the seal have an outer bead projection 63 for mating reception with inner protrusion of the seal clamp. The shoulder seals each further comprise a second end 64a,b that is a free or unconstrained end. Thus the shoulder seals are not subject to axial tension which substantially reduced the life of the center sleeve. The free end 64a,b rests on the outer surface 23a,b (FIG. 11) of the center segments 22a,b, and will slide relative to the center segments when the drum is radially expanded. The outer surface 23a,b has a smaller outer diameter than the center of the center section, forming a radial step so that when the shoulder seals are mounted, the shoulder seals form a flush surface with the center section of the drum.

Figure 4:
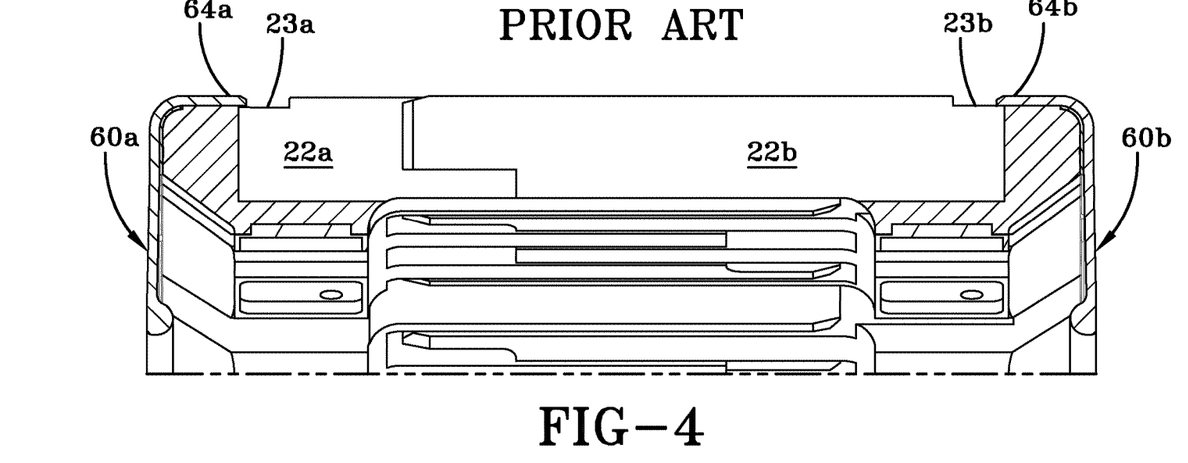
FIG. 4 is a close up cross-sectional view of the tire building drum in the expanded high crown condition shown with the shoulder sleeves of the present invention.
Figure 5:
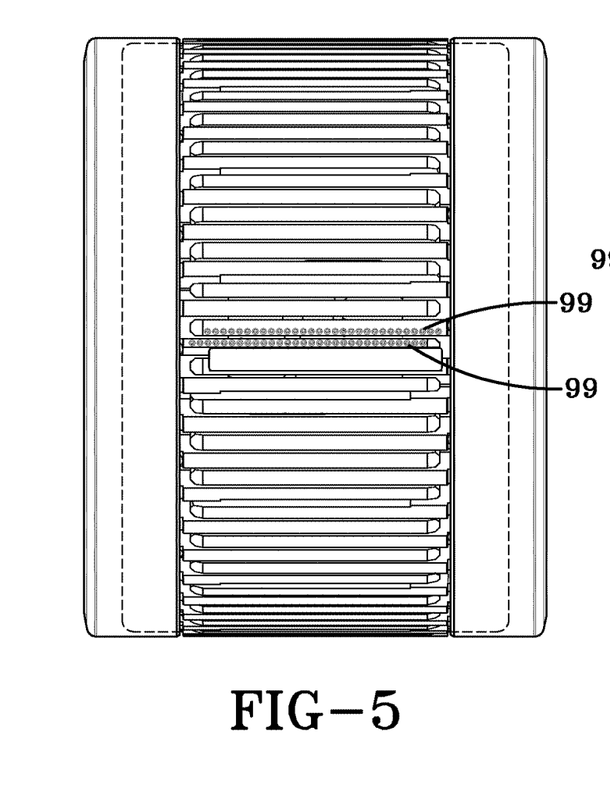
FIG. 5 is a front view of the center section of the tire building drum in the axially contracted position.
Figure 6:
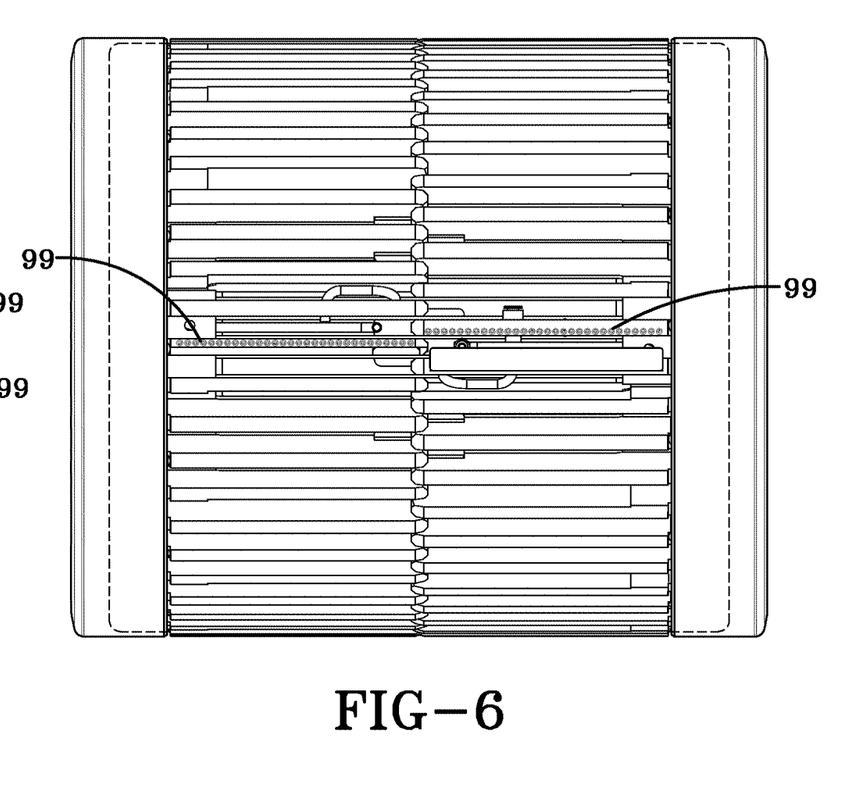
FIG. 6 is a front view of the center section of the tire building drum in the axially expanded position.
Figure 7:
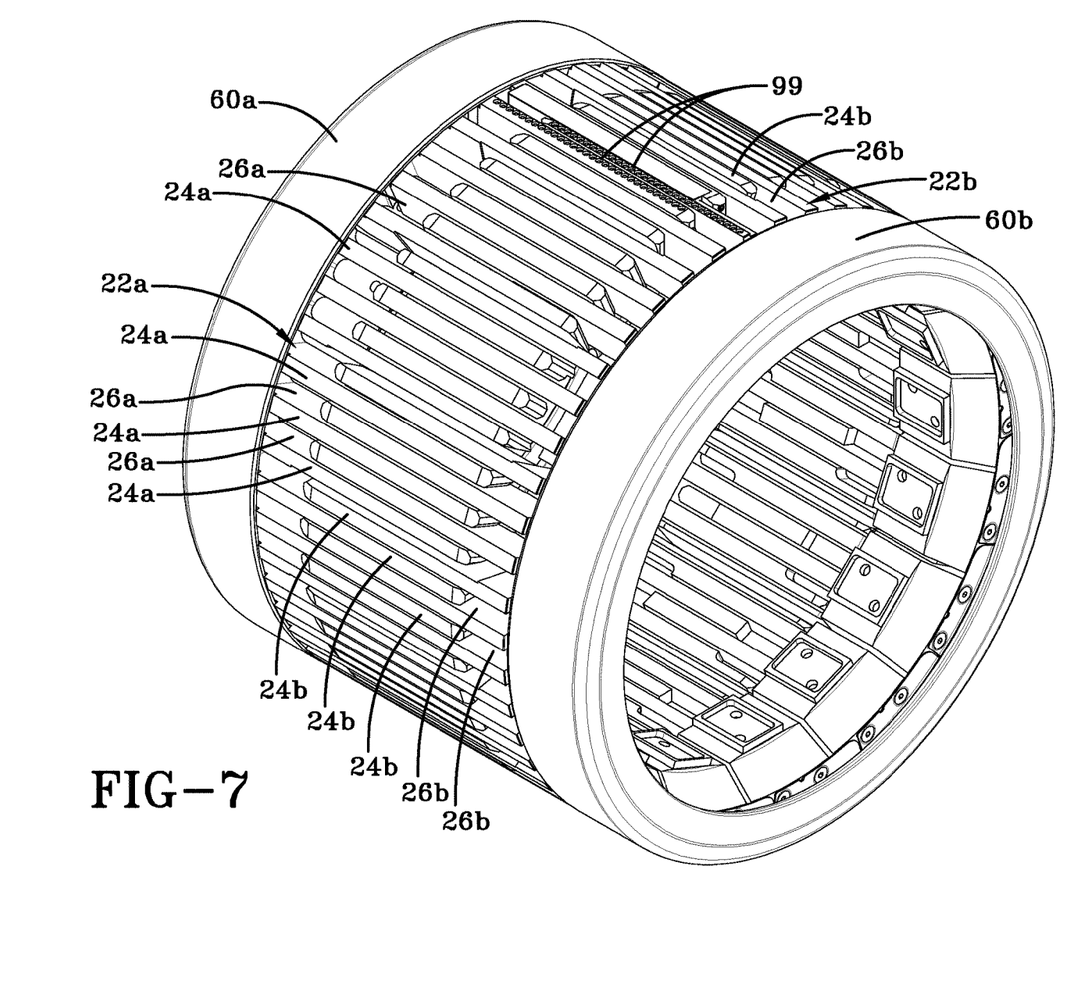
FIG. 7 is a perspective view of the center section of the tire building drum shown in the axially contracted position.

Each shoulder seal may be cast in a mold (not shown) in the desired shape or as shown in FIG. 4. Preferably each seal is cast or formed in a "L" shape as shown. The seal may be made from rubber, polyurethane, or other flexible material.

The segments have been redesigned so that the innerliner is applied directly to the outer radial surface of the segments instead of the center sleeve. At least one finger of a segment (see FIGS. 5-7) is equipped with one or more vacuum holes 99 to enable fixing the leading edge of the innerliner to the drum using vacuum. Preferably, a finger of each of a left segment and a right segment is equipped with vacuum holes.

Bead Lock Mechanism

Adjacent the center section 20 are first and second annular bead locking mechanisms 25. The bead lock mechanism are radially expandable into a bead clamp position in order to secure the bead during the tire building process. FIG. 2 illustrates the bead locking mechanisms 25 in the retracted position.

Shoulder Section and Shoulder Clamp Lock

The right and left hand shoulder section 29 of the tire building drum 5 is defined as the drum components located axially outward of the centerline of the center section, inclusive of the seal clamps and the bead lock mechanisms. The left and right hand shoulder sections of the tire building drum are axially slidable on bearing sleeves. The shoulder sections 29 are actuated by drive pins 125 mounted on nuts 130, which ride along drive screw 121. When the central screw is rotated, the nuts 130 move axially inward/outward, causing the drive pins 125 and each shoulder section to move axially inward/outward in corresponding fashion. In addition, the drive pins are also in mechanical cooperation with the split center segments, causing the split center segments 22a,b to axially extend or contract.

When the center section 20 of the tire building drum 5 moves into the high crown position as shown in FIG. 2, the bead lock mechanisms 25 and the seal clamp mechanism 70 are further actuated axially inward so that seal clamp is received in recess 74. The axial actuation of the bead lock mechanisms and seal clamps preferably occurs simultaneously with the movement of the center segments into the high crown position.

Drive Shaft

A central drive shaft 120 is provided for rotational movement of the tire building drum 5 about its longitudinal axis. The central shaft 120 is connected to a drive means (not shown). Provided within the central drive shaft 120 is a central screw 121. The central screw 121 is supported at each end by bearings 123. The threads on one side of the central screw 121 are left handed and on the opposite side are right handed. On the left hand side is an inboard nut 125 connected to the one end of the threaded screw 121 and similarly on the opposite right hand side is an outboard ball nut 125 connected to the central screw 121.

Turn Up Bladders

An upper bladder 150 extends axially outward from the bead lock mechanism 25 to the respective ends of the tire building drum. The upper bladder 150 extends over a lower bladder 152, which is mounted in the shoulder area of the drum and extends axially outward to the respective ends of the tire building drum. The upper and lower bladders function as turnup bladders which are used to inflate and, thereby, make the turn-up ends of the ply wrap about the apex and bead cores.

While certain representative embodiments and details have been shown for the purpose of illustrating the invention, it will be apparent to those skilled in this art that various changes and modifications may be made therein without departing from the spirit or scope of the invention.

What is claimed is:

1. A tire building drum comprising: a rotatable drum having a first and second shoulder section and a center section positioned therebetween, each shoulder section having a bead lock mechanism, wherein the center section has a first axially outer end forming a first shoulder and a second axially outer end forming a second shoulder, and wherein the center section extends between the first axially outer end and the second axially outer end, wherein said center section is not covered by a sleeve that extends from the first axially outer end to the second axially outer end of the center section, wherein a first shoulder seal is mounted on the first shoulder and a second shoulder seal is mounted on the second shoulder, wherein each shoulder seal has a first end received in a clamp and a second portion that extends over its respective shoulder of the center section terminating in a free end, wherein each free end is located axially between the clamps, wherein said center section further comprises a first half and a second half, wherein the first half and the second half are axially movable with respect to each other so that the center section has an adjustable width, and wherein the first half is mutually intermeshed with respect to the second half.

2. The tire building drum of claim 1 wherein the first half is slidably mounted within the second half.

3. The tire building drum of claim 1 wherein the free end of each shoulder seal is located between the axially outer ends of the center section.

4. The tire building drum of claim 1 wherein the clamp of each shoulder seal is located between its nearest one of the bead lock mechanisms and its nearest one of the shoulders of the center section.

* * * * *